C. B. BILLINGHURST.
DEVICE FOR CONTROLLING SHOCK.
APPLICATION FILED APR. 25, 1917.

1,253,129.

Patented Jan. 8, 1918.
2 SHEETS—SHEET 1.

WITNESSES
John P. Phillips Jr.
W. E. Beck

INVENTOR
CHARLES B. BILLINGHURST,
BY
ATTORNEYS

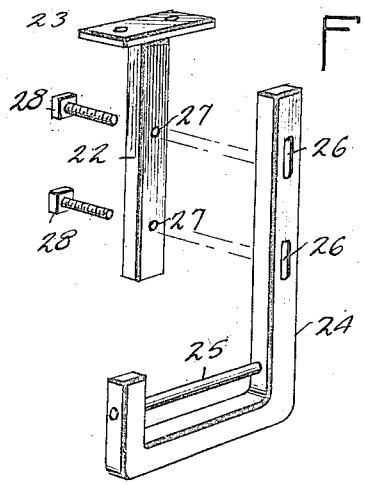
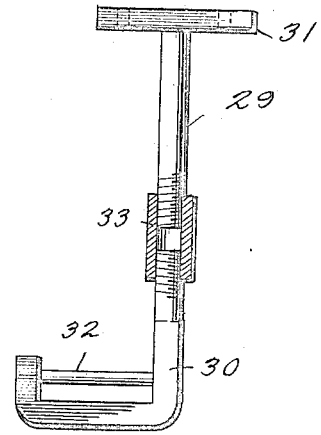
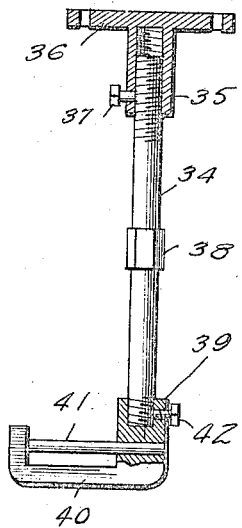
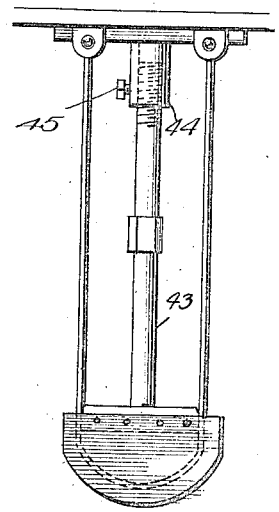
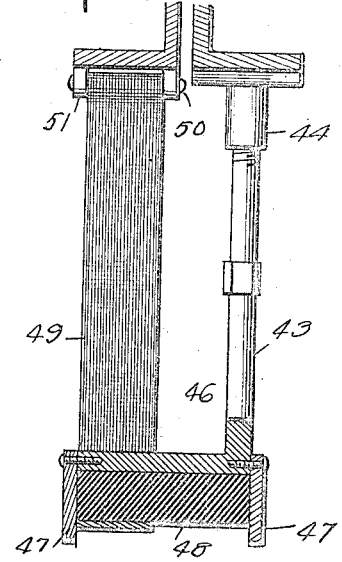

UNITED STATES PATENT OFFICE.

CHARLES BRYAN BILLINGHURST, OF PIERRE, SOUTH DAKOTA.

DEVICE FOR CONTROLLING SHOCK.

1,253,129.

Specification of Letters Patent.

Patented Jan. 8, 1918.

Application filed April 25, 1917. Serial No. 164,399.

*To all whom it may concern:*

Be it known that I, CHARLES B. BILLINGHURST, a citizen of the United States, and a resident of Pierre, in the county of Hughes and State of South Dakota, have invented new and useful Improvements in Devices for Controlling Shock, of which the following is a specification.

My invention is an improvement in devices for controlling shock, and the invention has for its object the provision of mechanism especially adapted for use in connection with motor vehicles, for eliminating shock and jar resultant from the movement of the vehicle over the road.

In the drawings:

Fig. 3 is a perspective view of a modified form of pendant or hanger;

Fig. 4 is a side view, with the parts in section, of another modification;

Fig. 5 is a side view of another embodiment of the invention, with parts in section;

Fig. 6 is a front view of another embodiment of the invention;

Fig. 7 is a section on the line 7—7 of Fig. 6.

Figure 1:
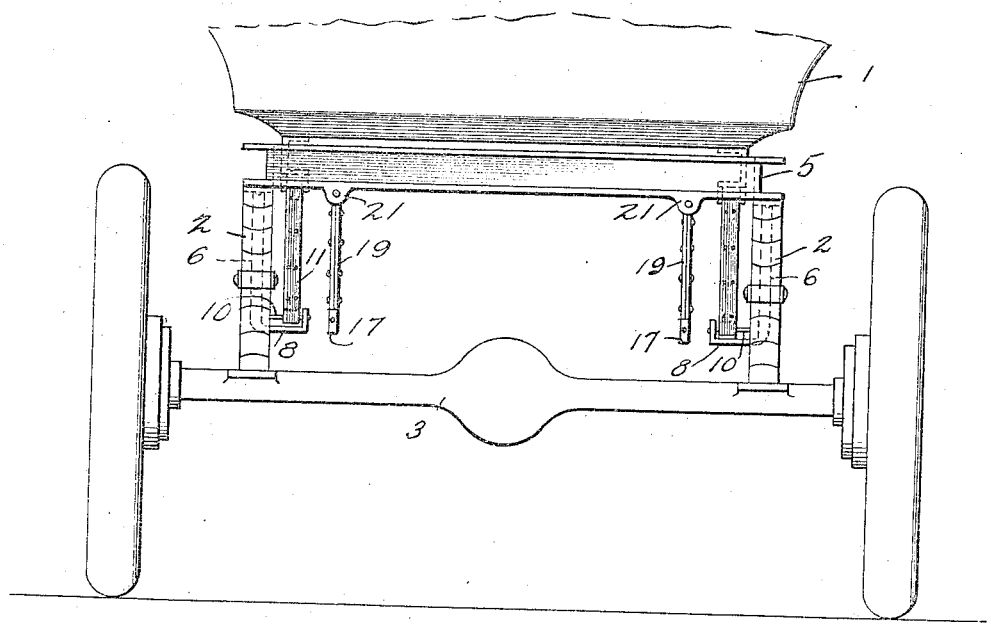
Figure 1 is a rear view of a vehicle provided with the improved device.
Figure 2:
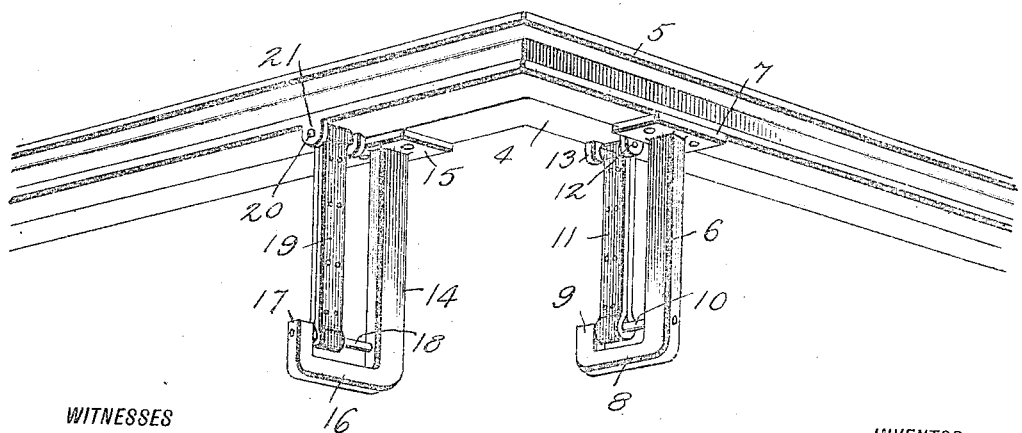
Fig. 2 is a partial perspective view of the frames of the motor car.

The present embodiment of the invention is shown in connection with a motor vehicle, being arranged between the body 1 and the springs 2, which are mounted on the axle 3 in the usual manner. Inner and outer frames 4 and 5 are provided, said frames being substantially rectangular in outline and of channel material, the inner frame being arranged with the channel inward and the outer frame with the channel outward, that is, the body portions of the two frames are adjacent.

The outer frame 5 is provided at each side and near the ends of the sides with pendants or standards 6, each of the said pendants having a base 7 which is secured to the frame, and a lateral arm 8 having an upstanding lug 9 at the end remote from the pendant body. A pin or rod 10 extends between the lug 9 and the body of the pendant, and one end of a hanger 11 of leather or the like is engaged with the pin, the other end being engaged with the pin 12 arranged between spaced lugs 13 on the inner frame 4.

This hanger 11, as shown, is of leather doubled upon itself, to form loops or eyes at its ends, and the superposed portions of the strap are riveted together, as shown.

At each end of the inner frame 4, and near the ends of the said ends, other standards or pendants 14 are provided, each pendant having a base 15 which is secured to the inner frame, and a lateral arm 16 at its lower end, each arm having an upstanding lug 17 at its outer end.

A pin 18 is supported by the body of the pendant and the lug, and one end of the hanger 19 corresponding to the hanger 11 is connected to the pin, the other being connected with a pin 20 supported by lugs 21 on the inner frame. Thus the outer frame carries four pendants, as does also the inner frame, and each pendant is connected to the other frame by the flexible non-metallic hangers 11 or 19, as the case may be.

In the embodiment of the invention shown in Fig. 3, the pendant is sectional, consisting of an upper section 22, having a base 23 for connection with the frame, and a lower section 24, which carries a pin 25. The section 24 has slots 26, and the section 22 has openings 27 adapted to register with the slots, for receiving bolts 28 for connecting the sections, the bolts being engaged with the usual nuts. It will be evident that the construction permits the length of the pendant to be varied.

In the embodiment shown in Fig. 4, the pendant consists of an upper section 29 and a lower section 30, the upper section having a base 31 for connection with the frame, and the lower section having the pin 32 for connection with the hanger. The adjacent ends of the sections 29 and 30 are oppositely threaded, for engagement by a double sleeve nut 33, and by means of the nut the sections may be moved toward and from each other to vary the length of the pendant. The nut 33 will have a polygonal exterior for engagement by a wrench.

In the embodiment of the invention shown in Fig. 5, the pendant 34 is engaged at its upper end with an internally threaded socket 35 which has a base 36 for connection with the frame. A set screw 37 is threaded through the socket into engagement with the pendant to hold it in adjusted position, and the pendant has a polygonal portion 38 for engagement by a wrench to turn the same. The lower end of the pendant is received within a socket 39, in one end of a substantially U-shaped pin-carrying member 40, the pin 41 being held between the arms of the pin shaped member. A set screw 42 is threaded through the socket into engagement with the pendant to hold the pin-carrying member in place.

In the embodiment of the invention shown in Figs. 6 and 7, the pendant body 43 is threaded at its upper end into a socket 44, and is held from turning by a set screw 45. The lower end of the pendant body has a lateral extension or arm 46, which is provided at each end with a depending flange plate 47, the flange plate being held to the arm and the pendant by screws, as shown. A block 48 of rubber or the like is seated on the under face of the lateral arm or extension, between the flanges, and the hanger 49 passes beneath the block, having its ends connected with pins 50 which are supported by lugs 51 on the frame. This construction of connection provides for some resiliency, the rubber block 48 giving a slight resiliency to cushion the movement between the frames.

In all of the constructions described the inner frame which carries the body is supported from the outer frame by the hangers and pendants at the ends of the frame, and the inner frame is prevented from upward movement with respect to the outer frame by the hangers and pendants at the sides of the frame.

I claim:

1. In a motor vehicle of the character specified, comprising, in combination with the inner and the outer substantially rectangular frames, the inner frame being adapted to support the body, and the outer frame being adapted to be connected with the springs of the vehicle, of a flexible non-metallic connection between said frames, and comprising pendants on the frames and straps of flexible non-metallic material between the pendants and the other frame, each pendant comprising a body portion connected at one end to the frame and having at the other a lateral arm provided with an upstanding lug, and a pin arranged between the lug and the body of the pendant, said pendant being sectional, and the sections being adjustable with respect to each other.

2. In a motor vehicle of the character specified, comprising, in combination with the inner and the outer substantially rectangular frames, the inner frame being adapted to support the body, and the outer frame being adapted to be connected with the springs of the vehicle, of a flexible non-metallic connection between said frames, and comprising pendants on the frames and straps of flexible non-metallic material between the pendants and the other frame, each pendant comprising a body portion connected at one end to the frame and having at the other a lateral arm provided with an upstanding lug, and a pin arranged between the lug and the body of the pendant.

3. In a motor vehicle of the character specified, comprising, in combination with the inner and the outer substantially rectangular frames, the inner frame being adapted to support the body, and the outer frame being adapted to be connected with the springs of the vehicle, of a flexible non-metallic connection between said frames, and comprising pendants on the frames and straps of flexible non-metallic material between the pendants and the other frame, said connection comprising a pendant consisting of a body and a base, the base being adapted for connection with the frame and having a threaded socket, the upper end of the body being threaded into the socket, and said body having at its lower end a lateral extension, detachable flange plates at the ends of the extension, a block of resilient material held between the flange plates beneath the extension, and a strap passing beneath the block and connected at its upper ends to the frame.

4. In a motor vehicle of the character specified, comprising, in combination with the inner and the outer substantially rectangular frames, the inner frame being adapted to support the body, and the outer frame being adapted to be connected with the springs of the vehicle, of a flexible non-metallic connection between said frames, and comprising pendants on the frames and straps of flexible non-metallic material between the pendants and the other frame, said pendants being composed of sections adjustable with respect to each other to vary the effective length of the pendant.

CHARLES BRYAN BILLINGHURST.

Copies of this patent may be obtained for five cents each, by addressing the "Commissioner of Patents, Washington, D. C."